United States Patent [19]

Balducci et al.

[11] 4,230,500
[45] Oct. 28, 1980

[54] INORGANIC PIGMENTS AND METHOD FOR PREPARING SAME

[75] Inventors: Luigi Balducci, Alessandria; Massimo Rustioni, Pozzolo Formigaro, both of Italy

[73] Assignee: Montedison S.p.A., Milan, Italy

[21] Appl. No.: 68,683

[22] Filed: Aug. 22, 1979

[30] Foreign Application Priority Data

Aug. 23, 1978 [IT] Italy ................. 26955 A/78

[51] Int. Cl.$^2$ .............................................. C09C 1/00
[52] U.S. Cl. .............................. 106/288 B; 106/73.4; 423/306; 423/593
[58] Field of Search .................. 106/288 B, 73.4; 423/593, 306

[56] References Cited

U.S. PATENT DOCUMENTS

| | | | |
|---|---|---|---|
| 4,026,722 | 5/1977 | Hess | 106/288 B |
| 4,115,141 | 9/1978 | Piltingsrud | 106/288 B |

*Primary Examiner*—Helen M. McCarthy

[57] ABSTRACT

There are disclosed new greenish-yellow, yellow and orange-yellow pigments which consist substantially of bismuth vanadate of monoclinic structure, bismuth phosphate of monoclinic structure and aluminum phosphate of orthorhombic structure and which, in the case of the yellow and orange-yellow pigments, also comprise a compound based on $Bi_2O_3$ and $V_2O_5$ the X-rays diffraction pattern of which shows the following peaks: 1.87, 1.88, 2.41, 2.77, 2.80, 3.11, 3.82 and 7.6 Å. The new pigments are characterized by a dominant wave length $\lambda_D$ of from 573 to 586 m$\mu$, and have a molar ratio of $Bi_3O_3/P_2O_5$ equal to 1, and a $Bi_2O_3/V_2O5$ molar ratio of from 1.39 to 5.59, inclusive, while their molar ratio $Al_2O_3/V_2O_5$ lies within specified ranges of values. Also disclosed is a method for preparing the new pigments by calcining, in the presence of air, $BiPO_4$, $Al_2O_3$ and $V_2O_5$ or compounds which generate $Al_2O_3$ and $V_2O_5$ during the calcination.

7 Claims, No Drawings

INORGANIC PIGMENTS AND METHOD FOR PREPARING SAME

THE PRIOR ART

The inorganic yellow pigments which are presently most in use are chrome yellows (based on lead chromate), cadmium yellows (based on cadmium sulphide) and cadmiopone yellows (based on cadmium sulphide and barium sulphate). The most diffused orange-yellows are the chrome orange pigments (based on basic lead chromate) and the cadmium orange pigments (based on cadmium sulphoselenides). Since they contain lead and hexavalent chrome or cadmium, these different pigments are suspect with respect to toxicity.

Alternative pigments based on nickel titanates $TiO_2$—$NiO$—$Sb_2O_3$ (greenish-yellow) and on chromium titanates $TiO_2$—$Cr_2O_3$—$Sb_2O_3$ (orange-yellows) are known. These pigments do not have, however, properties comparable to those of the above-cited traditional pigments as regards color saturation (color intensity), colorimetric purity and tinting strength.

It has also been proposed to use bismuth vanadate $BiVO_4$ of monoclinic crystalline structure as a substitute pigment. In fact, this product shows optical and pigmenting properties similar to those of the chrome yellow "primerose". However, its cost is too high for it to be commercially feasible due to the high price of the raw materials used for its preparation: i.e., vanadium and bismuth compounds. Furthermore, it is not endowed with high thermal stability.

THE PRESENT INVENTION

On object of this invention is to provide new greenish-yellow, yellow and orange-yellow pigments free from chromium, lead and cadmium, and that are endowed with optical characteristics similar to those of chrome yellow, chrome orange, cadmium yellow, cadmiopone yellow and cadmium orange pigments.

Another object of this invention is to provide new pigments based on $BiVO_4$ that are cheaper than the pigment of only $BiVO_4$, thanks to the presence of other components of lower cost and that are endowed with a higher thermal stability in respect of the pigment of only $BiVO_4$.

Still another object of this invention is to provide a process for obtaining the new pigments.

These and other objects are achieved by the present invention which provides the greenish-yellow, yellow and orange-yellow pigments having a dominant length wave comprised between 573 and 586 m$\mu$, and which substantially consist of bismuth vanadate of monoclinic crystal structure, bismuth phosphate of monoclinic crystal structure and aluminum phosphate of orthorhombic crystal structure and, in the case of yellow and orange yellow pigments, also of a compound based on $Bi_2O_3$ and $V_2O_5$ the X-rays diffractogram of which shows the following peaks: 1.87; 1.88; 2.41; 2.77; 2.80; 3.11; 3.82 and 7.6 Å.

In these pigments, the molar ratio $Bi_2O_3/P_2O_5$ is equal to 1, while the molar ratio $Bi_2O_3/V_2O_5$ is comprised between 1.39 and 5.59. The molar ratio $Al_2O_3/V_2O_5$ is different for the greenish-yellow and for the yellow and orange-yellow products, and it varies according to the molar ratio $Bi_2O_3/V_2O_5$ as follows:

| Molar Ratio $Bi_2O_3/V_2O_5$ | Molar Ratio $Al_2O_3/V_2O_5$ of the greenish-yellow products | Molar Ratio $Al_2O_3/V_2O_5$ of the yellow and orange-yellow products |
|---|---|---|
| 5.59 | 1–3.1 | >3.1–5.35 |
| 4.19 | 1–2.4 | >2.4–4.0 |
| 3.35 | 1–2.1 | >2.1–3.2 |
| 2.79 | 1–1.8 | >1.8–2.7 |
| 2.39 | 1–1.6 | >1.6–2.3 |
| 2.09 | 1–1.5 | >1.5–2.0 |
| 1.86 | 1–1.4 | >1.4–1.8 |
| 1.67 | 1–1.3 | >1.3–1.6 |
| 1.52 | 1–1.2 | >1.2–1.45 |
| 1.39 | 1–1.18 | >1.18–1.35 |

In fact, it has been found that pigments consisting of the first three compounds of the tabulation and having the molar ratios between the oxides $Bi_2O_3$, $V_2O_5$, $Al_2O_3$ and $P_2O_5$ defined above, have a greenish-yellow color corresponding to a dominant wave length $\lambda_D$ comprised between 573 and 575 m$\mu$ (for the definition of $\lambda_D$, see for instance the treatise by A. G. Hardy: "Handbook of Colorimetry", Massachussets Institute of Technology, Cambridge, Mass., 1936, in particular page 11). Said compounds have excellent optical characteristics, that are equal to those of chrome yellow, cadmium yellows and cadmiopone yellows, and superior to those of nickel titanates, in particular as far as the color saturation (color purity), the colorimetric purity and the tinting strength are concerned.

We have also found that when the fourth compound is present, the pigments have a yellow or orange-yellow color corresponding to a $\lambda_D$ of 575–586 m$\mu$. At the same time, in the presence of the fourth compound, the molar ratio $Al_2O_3/V_2O_5$ is higher with respect to that of the greenish-yellow pigments, as appears from the foregoing table.

These new yellow and orange-yellow pigments have optical characteristics that are superior to those of the chrome titanates, in particular as to the color saturation and colorimetric purity.

These new greenish-yellow, yellow and orange-yellow pigments having a dominant wave length comprised between 573 and 586 m$\mu$, are obtained, according to this invention, starting from a mixture of $BiPO_4$, $Al_2O_3$ and $V_2O_5$ or aluminum and vanadium compounds capable of generating $Al_2O_3$ and $V_2O_5$ during the successive calcining phase, the molar ratios between $Bi_2O_3$, $V_2O_5$, $Al_2O_3$ and $P_2O_5$ in said mixture being in agreement with those previously defined herein.

The mixture is calcined in the presence of air, at temperatures comprised between 700° and 1100° C. when greenish-yellow pigments with a molar ratio $Bi_2O_3/V_2O_5$ greater than or equal to 1.67 are to be obtained; at temperatures comprised between 880° and 1100° C. when a greenish-yellow pigment with a molar ratio $Bi_2O_3/V_2O_5$ lower than 1.67 is desired and at temperatures comprised between 900° and 1100° C. when one wishes to obtain a yellow or orange-yellow pigment. At the end of the calcining, the product is slowly cooled down and is then wet-ground.

The chemical reactions which presumably are involved may be schematized in the following way:

$$2\, BiPO_4 + Al_2O_3 \rightarrow Bi_2O_3 + 2\, AlPO_4 \quad (1)$$
$$Bi_2O_3 + V_2O_5 \rightarrow 2\, BiVO_4 \quad (2)$$

-continued $$2\ BiPO_4 + Al_2O_3 + V_2O_5 \rightarrow 2\ BiVO_4 + 2\ AlPO_4 \qquad (3)$$

In reaction (1), the bismuth phosphate is always in excess with respect to $Al_2O_3$: in this way the presence of bismuth phosphate in the end product is ensured.

As already explained, the greenish-yellow pigments contain three crystalline phases, evidenced by the diffractometric analysis under X-rays: monoclinic bismuth phosphate (in general present in two forms: one of monazite type and one called "high temperature form"), orthorhombic aluminum phosphate and monoclinic bismuth vanadate. When the molar ratio $Al_2O_3/V_2O_5$ is equal to 1, the reaction (2) occurs in a stoichiometric way inasmuch as one mole of $Al_2O_3$ frees in reaction (1) one mole of $Bi_2O_3$ which reacts with one mole of $V_2O_5$ in reaction (2). If the molar ratio $Al_2O_3/V_2O_5$ is greater than 1, it may be assumed that there either remains an excess of $Al_2O_3$ in the end product or that $Al_2O_3$ reacts completely according to reaction (1) wherefore there is an excess of $Bi_2O_3$ in reaction (2). Under X-rays examination, there is found no presence either of $Al_2O_3$ or of $Bi_2O_3$. However, it cannot be excluded that, in the end product, there may be small quantities of $Al_2O_3$ or $Bi_2O_3$.

One may also assume that there is formed a solid solution of $Bi_2O_3$ in $BiVO_4$.

In the case of yellow and orange-yellow pigments, on the contrary, the greater excess of $Al_2O_3$ with respect to $V_2O_5$, gives place to the formation of the fourth crystalline phase mentioned above; as could be deduced from the tests carried out on the system $Bi_2O_3$—$V_2O_5$, it is the question of a new compound based on $Bi_2O_3$ and $V_2O_5$, whose peaks of diffraction under X-rays examination of greatest intensity are the following:

| interplanar distance in A | relative intensity |
|---|---|
| 1.87 | very low |
| 1.88 | very low |
| 2.41 | very low |
| 2.77 | low |
| 2.80 | low |
| 3.11 | high |
| 3.82 | very low |
| 7.6 | low |

The determination was carried out on a Siemens diffractometer using a $CuK\alpha$ radiation.

The percentual composition by weight of the pigments in $Bi_2O_3$, $V_2O_5$, $Al_2O_3$ and $P_2O_5$ in relation to the molar ratio $Bi_2O_3/V_2O_5$ may be calculated on the basis of the molar ratios between the various oxides defined previously.

These percentual compositions are reported, for the greenish-yellow pigments in Table I while in Table II they are recorded for the yellow and orange-yellow pigments. The usefulness of the two columns on the right end of the table are explained infra.

TABLE I

| | | | Greenish-yellow Pigments | | | | |
|---|---|---|---|---|---|---|---|
| Molar ratio $Bi_2O_3/V_2O_5$ | Molar ratio $Al_2O_3/V_2O_5$ | % $Bi_2O_3$ by weight on the total | $V_2O_5$ % by weight on the total | $Al_2O_3$ % by weight on the total | $P_2O_5$ % by weight on the total | % by weight of V on starting $BiPO_4$ | % by weight of Al on starting $BiPO_4$ |
| 5.59 | 1–3.1 | 70.74–66.84 | 4.93–4.67 | 2.76–8.12 | 21.55–20.36 | 3 | 1.59–4.93 |
| 4.19 | 1–2.4 | 68.97–65.65 | 6.42–6.11 | 3.60–8.23 | 21.01–20.00 | 4 | 2.12–5.09 |
| 3.35 | 1–2.1 | 67.28–64.17 | 7.83–7.47 | 4.39–8.81 | 20.49–19.55 | 5 | 2.65–5.57 |
| 2.79 | 1–1.8 | 65.67–63.08 | 9.18–8.81 | 5.14–8.90 | 20.01–19.21 | 6 | 3.18–5.72 |
| 2.39 | 1–1.6 | 64.14–61.95 | 10.45–10.10 | 5.86–9.07 | 19.54–18.87 | 7 | 3.71–5.94 |
| 2.09 | 1–1.5 | 62.68–60.69 | 11.68–11.31 | 6.54–9.52 | 19.09–18.49 | 8 | 4.24–6.36 |
| 1.86 | 1–1.4 | 61.28–59.56 | 12.84–12.48 | 7.20–9.81 | 18.67–18.14 | 9 | 4.77–6.68 |
| 1.67 | 1–1.3 | 59.95–58.57 | 13.96–13.64 | 7.82–9.95 | 18.26–17.84 | 10 | 5.30–6.89 |
| 1.52 | 1–1.2 | 58.67–57.69 | 15.03–14.78 | 8.42–9.96 | 17.87–17.57 | 11 | 5.83–7.00 |
| 1.39 | 1–1.18 | 57.45–56.52 | 16.05–15.80 | 9.00–10.47 | 17.50–17.22 | 12 | 6.36–7.51 |

TABLE II

| | | | Yellow and Orange-yellow Pigments | | | | |
|---|---|---|---|---|---|---|---|
| Molar ratio $Bi_2O_3/V_2O_5$ | Molar ratio $Al_2O_3/V_2O_5$ | % $Bi_2O_3$ by weight on the total | $V_2O_5$ % by weight on the total | $Al_2O_3$ % by weight on the total | $P_2O_5$ % by weight on the total | % by weight of V on starting $BiPO_4$ | % by weight of Al on starting $BiPO_4$ |
| 5.59 | >3.1–5.35 | <66.84–63.12 | <4.67–4.41 | >8.12–13.23 | <20.36–19.23 | 3 | >4.93–8.50 |
| 4.19 | >2.4–4.0 | <65.65–62.21 | <6.11–5.79 | >8.23–13.03 | <20.00–18.95 | 4 | >5.09–8.50 |
| 3.35 | >2.1–3.2 | <64.17–61.32 | <7.47–7.14 | >8.81–12.85 | <19.55–18.68 | 5 | >5.57–8.50 |
| 2.79 | >1.8–2.7 | <63.08–60.46 | <8.81–8.44 | >8.90–12.67 | <19.21–18.41 | 6 | >5.72–8.50 |
| 2.39 | >1.6–2.3 | <61.95–59.62 | <10.10–9.71 | >9.07–12.49 | <18.87–18.16 | 7 | >5.94–8.50 |
| 2.09 | >1.5–2.0 | <60.69–58.80 | <11.31–10.95 | >9.52–12.32 | <18.49–17.91 | 8 | >6.36–8.50 |
| 1.86 | >1.4–1.8 | <59.56–58.01 | <12.48–12.15 | >9.81–12.15 | <18.14–17.67 | 9 | >6.68–8.50 |
| 1.67 | >1.3–1.6 | <58.57–57.23 | <13.64–13.33 | >9.95–11.99 | <17.84–17.43 | 10 | <6.89–8.50 |
| 1.52 | >1.2–1.45 | <57.69–56.48 | <14.78–14.47 | >9.96–11.83 | <17.57–17.20 | 11 | >7.00–8.50 |
| 1.39 | >1.18–1.35 | <56.52–55.75 | <15.80–15.58 | >10.47–11.68 | <17.22–16.98 | 12 | >7.51–8.50 |

For the greenish-yellow pigments there may be determined the $Al_2O_3/V_2O_5$ molar ratios (and consequently also the ponderal ratios of the various oxides) that correspond to values of the $Bi_2O_3/V_2O_5$ molar ratios not reported in Table I, by proceeding in the following manner: while the minimum molar ratio $Al_2O_3/V_2O_5$ is always equal to 1, the maximum molar ratio may be calculated on the basis of the following empirical equation obtained on the basis of the gathered experimental data:

$$\text{Maximum molar ratio } \frac{Al_2O_3}{V_2O_5} = 0.905 \times \left( \text{molar ratio } \frac{Bi_2O_3}{V_2O_5} \right)^{0.693}$$

For the yellow and orange-yellow pigments, the molar ratios $Al_2O_3/V_2O_5$ that correspond to values of the molar ratio $Bi_2O_3/V_2O_5$, not reported in Table II, are determined by proceeding in the following way: the minimum $Al_2O_3/V_2O_5$ molar ratio is obviously greater than the maximum molar ratio $Al_2O_3/V_2O_5$ of the greenish-yellow pigment having the same value of the molar ratio $Bi_2O_3/V_2O_5$. The maximum $Al_2O_3/V_2O_5$ molar ratio is that corresponding to the molar ratio $Al_2O_3/Bi_2O_3 = 0.958$, whatever the value of molar ratio $Bi_2O_3/V_2O_5$ is. Considering equation (1) it will be seen, in fact, that the molar ratio $Al_2O_3/Bi_2O_3$ must be inferior to 1, otherwise the end product would not contain $BiPO_4$.

As already stated, in all the pigments according to this invention, the molar ratio $Bi_2O_3/V_2O_5$ is comprised between 1.39 and 5.59. A molar ratio greater than 5.59 gives pigments with an insufficient color saturation, while a molar ratio lower than 1.39 gives more expensive pigments due to their high content of $V_2O_5$ and which do not have better chromatic characteristics. The pigments that have a molar ratio comprised between 1.39 and 2.79, are presently preferred because they are endowed with a high color saturation and with a high tinting strength. Particularly presently preferred pigments are those having a molar ratio comprised between 1.39 and 1.67.

In the greenish-yellow pigments, the molar ratio $Al_2O_3/V_2O_5$ shall not be lower than 1; molar ratios that are near the unit but less than unit (0.8–0.9) do not ensure products having the desired optical characteristics, while molar ratios decidedly below unit (i.e.: less than 0.8) yield brownish-green pigments. Vice versa, the variation of the molar ratio $Al_2O_3/V_2O_5$ within the limits of the invention does not introduce appreciable variations in the optical characteristics of the greenish-yellow pigments.

In the case of the yellow and orange-yellow pigments, at equal $Bi_2O_3/V_2O_5$ molar ratio and calcining temperature, to increasing molar ratios of $Al_2O_3/V_2O_5$, there correspond products that are progressively more orange, that is, to products having a growing $\lambda_D$.

The proportion of the various crystalline phases in the pigments of this invention depend on the molar ratios of the oxides.

In the greenish-yellow pigments, on reducing the molar ratio $Bi_2O_3/V_2O_5$ and on increasing the molar ratio $Al_2O_3/V_2O_5$, there are respectively increased the quantities of $BiVO_4$ and $AlPO_4$ to the detriment of the $BiPO_4$.

In the yellow and orange-yellow pigments, on increasing the molar ratio $Al_2O_3/V_2O_5$, the following variations occur: the fourth compound based on $Bi_2O_3$ and $V_2O_5$ becomes more abundant, while the quantity of $BiVO_4$ drops; also the quantity of $BiPO_4$ is reduced while the quantity of $AlPO_4$ is increased.

The starting bismuth phosphate may be, for instance, of a monoclinic or hexagonal crystal structure. It is preferred to use a product which has particles with a particle size comprised between 0.2 and 1 micron.

The starting vanadium compounds, for instance, may be: $V_2O_5$, $VO_2$, $V_2O_4$ or $NH_4VO_3$, while the aluminum compounds may be, for instance, $Al_2O_3$, $Al(OH)_3$, $Al_2(SO_4)_3$ or $Al(NO_3)_3$.

The proportion of the three starting compounds is chosen in consideration of the characteristics of the pigment to be obtained, keeping in mind the molar ratios between $Bi_2O_3$, $V_2O_5$, $Al_2O_3$ and $P_2O_5$ as previously defined. The last two columns of the Tables I and II, respectively, report the percentage by weight of vanadium with respect to the starting $BiPO_4$ corresponding to each molar ratio $Bi_2O_3/V_2O_5$, and the percentage by weight of the aluminum with respect to the starting $BiPO_4$ corresponding to the molar ratios $Al_2O_3/V_2O_5$ for each value of the molar ratio $Bi_2O_3/V_2O_5$.

The starting compounds are preferably wet mixed so as to ensure a good homogenization.

The mixture is subsequently dried, for instance at between 100° and 130° C., then homogenized, for instance, in a mechanical mortar and finally calcined at the temperatures defined above. The use of temperatures lower than the minimum values indicated herein results in the formation of products with non-homogeneous colors, while operating at temperatures exceeding the indicated maximum value (1100° C.) results in sintered products.

In the case of greenish-yellow pigments having a $Bi_2O_3/V_2O_5$ molar ratio greater than or equal to 1.67, it is preferred to calcine at temperatures comprised between 850° and 1000° C. For the pigments having a molar ratio smaller than 1.67 and for the yellow and orange-yellow pigments it is preferable to operate at temperatures comprised between 900° and 1000° C. In the case of the yellow and orange-yellow pigments, in general it is noticed that on increasing the calcining temperature there are obtained products with a growing $\lambda_D$.

The calcining is carried out in the presence of air under static conditions, or preferably in a rotary furnace for ensuring a better homogenization of the reactants. The duration of the calcining operation is generally comprised between 1 and 3 hours.

At the end of the calcining, the products are allowed to slowly cool down, for instance to temperatures comprised between 200° C. and room temperature in a time comprised between 3 to 24 hours. Successively, the products are then removed from the oven, cooled down, if required, to room temperature and then wet-ground. It has been found that the wet-ground products show optical characteristics superior to those of corresponding products that have been dry-ground. The wet-grinding may be carried out, for instance, in ball mills, microsphere mills or sand mills. In general, the calcined product is subjected to dry-crushing before being wet-ground. At the end of the wet grinding, the product is filtered, washed and dried, for instance at 100°–130° C., and is then dry-ground, for instance in an automatic mortar.

The pigments thus obtained consist, in general, of particles of dimensions comprised between 0.5 and 3 micron and, on a sieve of 325 mesh, usually leave behind a maximum residue of 0.5% by weight.

Such pigments find their application in such fields in which colored inorganic pigments are commonly used, that is, in particular as colored pigments for paints and plastic materials.

Due to the high temperature at which the new pigments are prepared, and which impart a high thermic stability to them, they can be used in application fields where high working temperatures are required, application fields in which the use of pigments of only BiVO4 or of chrome yellows is precluded.

The following examples are given for further illustrating the invention and are not intended to be limiting.

EXAMPLE 1

There was used a monoclinic bismuth phosphate in the form of particles having an average size of 0.5 micron. The starting substances consisted of 20 g of BiPO4, 5.51 g of NH4VO3 (equal to 12% b.w. of V with respect to BiPO4) and 15.69 g of Al2(SO4)3.18H2O (equal to 6.36% b.w. of Al with respect to BiPO4). The molar ratio Al2O3/V2O5 was equal to 1.

These compounds were thoroughly wet-mixed with each other in a beaker. The mixture thus obtained was then dried at 130° C., again homogenized in a Pulverisette automatic mortar, whereafter it was calcined in a static air oven at 920° C. for 1 hour, in the presence of air.

The product was then allowed to cool down to room temperature in about 20 hours. The pigment thus obtained was wet-ground in a ball mill, filtered and washed.

The cake was dried at 110° C. The product was finally dry-ground in a Puverisette automatic mortar.

The greenish-yellow pigment thus obtained, when analyzed at the X-rays, proved to consist of the following compounds: mono clinic bismuth vanadate, monoclinic bismuth phosphate (monoazite and "high-temperature form") and orthorhombic aluminum phosphate. The percentage composition by weight was as follows:

|  | % by wt. |
|---|---|
| $Bi_2O_3$ | 57.45 |
| $V_2O_5$ | 16.05 |
| $Al_2O_3$ | 9.00 |
| $P_2O_5$ | 17.50 |

The medium particle size was about 0.8 micron.

The colorimetric characteristics of the pigment are determined on a film of dry paint having a thickness of 50 microns, obtained by dispersing in a Hoover type kneader, two parts of pigment in two parts of vehicle of the following composition:

|  | % by wt. |
|---|---|
| Aeroplaz 1279 (68% by weight of alkydic) resin; 32% of soya oil) | 76.3 |
| FL 30 (boiled linseed oil) | 19.0 |
| Drying mixture | 4.7 |

The drying mixture had the following composition:

|  | % by wt. |
|---|---|
| Ca naphthenate | 1.77 |
| Zr naphthenate | 5.31 |
| Co naphthenate | 6.9 |
| White spirit | 86.02 |

The colorimetric measurements were carried out by means of a differential Ducolor tristimulus colorimeter model 220 of the Neotec Instruments Corp.

From the tristimulus values Y, X and Z, supplied by the apparatus, in comparison to a standard calibrated with respect to magnesium oxide, the trichromatic coordinates (y, x,) were obtained and the values of the dominant wave length ($\mu_D$) and of the color saturation of the product were determined graphically (see treatise by A. G. Hardy, supra).

By means of the same equipment, there were also determined reflectances $R_V$, $R_A$, $R_B$ respectively on green, amber red and blue filters.

For purposes of comparison, the optical characteristics of the product obtained according to this Example and the characteristics of a commercial cadmiopone yellow and of a commercial nickel titanate, are reported in Table III.

From the examination of the results reported in Table III, it can be seen that the product obtained according to this invention displays chromatic characteristics that are superior to those of nickel titanate and that are similar to those of cadmiopone yellow.

TABLE III

| Examined Product | $R_V$ | $R_A$ | $R_B$ | $\lambda_D$ | Color Saturation in % |
|---|---|---|---|---|---|
| Product of Example 1 | 67.8 | 76.0 | 9.1 | 574.0 | 80.0 |
| Cadmiopone yellow | 69.5 | 77.3 | 9.1 | 574.0 | 80.0 |
| Nickel titanate | 70.7 | 76.2 | 23.3 | 573.0 | 55.0 |

EXAMPLES 2–12

Following the same procedures as in Example 1, the quantities of V and Al were varied with respect to the starting BiPO4, while maintaining unvaried the molar ratio Al2O3/V2O5 (equal to 1), and different calcining temperatures were used.

The operating procedures and the optical characteristics of the greenish-yellow pigments obtained are shown in Table IV.

TABLE IV

| Example No. | V% by weight with respect to starting BiPO4 | Al% by weight with respect to starting BiPO4 | Temperature °C. | $R_V$ | $R_A$ | $R_B$ | $\lambda_D$ | Color Saturation in % |
|---|---|---|---|---|---|---|---|---|
| 2 | 3 | 1.59 | 700 | 71.6 | 78.6 | 15.3 | 573.0 | 69.0 |
| 3 | 3 | 1.59 | 920 | 70.9 | 78.2 | 14.2 | 574.0 | 71.0 |
| 4 | 6 | 3.18 | 880 | 73.6 | 81.5 | 11.7 | 574.0 | 76.0 |
| 5 | 6 | 3.18 | 1000 | 71.7 | 81.0 | 10.6 | 574.0 | 78.0 |
| 6 | 8 | 4.24 | 700 | 70.8 | 78.5 | 11.7 | 573.5 | 77.9 |
| 7 | 8 | 4.24 | 1000 | 69.6 | 78.0 | 10.0 | 574.0 | 78.0 |
| 8 | 8 | 4.24 | 1100 | 71.9 | 81.5 | 9.9 | 574.0 | 79.0 |
| 9 | 10 | 5.30 | 700 | 72.8 | 81.1 | 10.9 | 574.0 | 76.5 |
| 10 | 10 | 5.30 | 920 | 70.6 | 79.1 | 9.6 | 574.0 | 79.2 |

TABLE IV-continued

| Example No. | V% by weight with respect to starting BiPO$_4$ | Al% by weight with respect to starting BiPO$_4$ | Temperature °C. | R$_V$ | R$_A$ | R$_B$ | λ$_D$ | Color Saturation in % |
|---|---|---|---|---|---|---|---|---|
| 11 | 10 | 5.30 | 1100 | 69.9 | 79.3 | 9.8 | 574.0 | 79.0 |
| 12 | 12 | 6.36 | 1000 | 71.4 | 81.7 | 9.0 | 574.7 | 81.0 |

EXAMPLES 13-27

Operating as in Example 1, the quantities of V and Al with respect to the starting BiPO$_4$ were varied, and molar ratios Al$_2$O$_3$/V$_2$O$_5$ greater than 1, but still such as to yield greenish-yellow pigments, were used. Different calcining temperatures were also used.

The operating procedures and the characteristics of the pigments obtained are recorded in Table V.

2.75 g of NH$_4$VO$_3$ (equal to 6% of V with respect to BiPO$_4$); and 21.1 g of Al$_2$(SO$_4$)$_3$.18H$_2$O (equal to 8.5% of Al with respect to BiPO$_4$).

The molar ratio Al$_2$O$_3$/V$_2$O$_5$ equals 2.7.

in Example 36:

20 g of BiPO$_4$, identical with that of Example 1;

4.59 g of NH$_4$VO$_3$ (equal to 10% of V with respect to BiPO$_4$); and

TABLE V

| Example No. | V% by weight with respect to starting BiPO$_4$ | Al% by weight with respect to starting BiPO$_4$ | Molar Ratio Al$_2$O$_3$/V$_2$O$_5$ | Temperature °C. | R$_V$ | R$_A$ | R$_B$ | λ$_D$ | Color Saturation in % |
|---|---|---|---|---|---|---|---|---|---|
| 13 | 3 | 2.23 | 1.4 | 920 | 73.3 | 82.7 | 15.0 | 573.4 | 70.8 |
| 14 | 3 | 2.23 | 1.4 | 1100 | 73.9 | 81.0 | 15.7 | 573.0 | 69.0 |
| 15 | 3 | 3.18 | 2.0 | 920 | 74.4 | 81.0 | 17.0 | 573.2 | 67.0 |
| 16 | 3 | 4.77 | 3.0 | 700 | 74.9 | 82.1 | 17.2 | 573.5 | 67.2 |
| 17 | 6 | 3.82 | 1.2 | 700 | 70.3 | 77.2 | 13.2 | 573.5 | 72.4 |
| 18 | 6 | 3.82 | 1.2 | 1100 | 72.1 | 80.5 | 12.1 | 574.0 | 75.0 |
| 19 | 6 | 4.52 | 1.4 | 920 | 73.1 | 82.3 | 11.3 | 574.0 | 76.5 |
| 20 | 6 | 4.52 | 1.4 | 1100 | 70.9 | 79.6 | 11.4 | 574.0 | 76.0 |
| 21 | 6 | 5.41 | 1.7 | 700 | 67.5 | 74.1 | 11.5 | 573.0 | 74.5 |
| 22 | 6 | 5.41 | 1.7 | 1000 | 68.2 | 77.1 | 12.0 | 574.5 | 74.0 |
| 23 | 8 | 5.09 | 1.2 | 700 | 68.1 | 75.6 | 10.5 | 573.5 | 77.0 |
| 24 | 8 | 5.09 | 1.2 | 1000 | 71.4 | 80.8 | 10.0 | 574.4 | 78.8 |
| 25 | 8 | 5.94 | 1.4 | 1000 | 71.6 | 81.3 | 10.7 | 574.6 | 77.5 |
| 26 | 10 | 6.36 | 1.2 | 1000 | 71.0 | 81.2 | 9.5 | 574.8 | 79.7 |
| 27 | 12 | 7.63 | 1.2 | 1000 | 67.0 | 76.7 | 8.2 | 574.6 | 81.0 |

EXAMPLES 28-34

Example 1 were repeated except that the starting vanadium and aluminum compounds were different and, also, bismuth phosphates of two different structures, monoclinic and hexagonal, were used.

In all tests, the ponderal percentage of vanadium (6%) and of aluminum (3.18%) with respect to the starting BiPO$_4$, corresponding to a molar ratio Al$_2$O$_3$/V$_2$O$_5$ equal to 1, was the same, as well as the calcining temperature, which was 880° C.

The operating procedures and the characteristics of the greenish-yellow pigments obtained are recorded in Table VI.

19.62 g of Al$_2$(SO$_4$)$_3$.18H$_2$O (equal to 7.94% of Al with respect to BiPO$_4$).

The molar ratio Al$_2$O$_3$/V$_2$O$_5$ equals 1.5.

The procedures of Example 1 were followed.

The orange-yellow pigments obtained, when analyzed under X-rays, proved to consist of monoclinic bismuth vanadate, monoclinic bismuth phosphate (of monazite and "high temperature form" structure), orthorhombic Al phosphate, and of the compound based on Bi$_2$O$_3$ and V$_2$O$_5$ described hereinabove.

The pigments had the following ponderal percentage of oxides:

TABLE VI

| Example No. | Crystalline structure of BiPO$_4$ | Vanadium compound | Aluminum compound | R$_V$ | R$_A$ | R$_B$ | λ$_D$ | Color saturation in % |
|---|---|---|---|---|---|---|---|---|
| 28 | Monoclinic | NH$_4$VO$_3$ | Al$_2$(SO$_4$)$_3$ | 73.6 | 81.5 | 11.7 | 574.0 | 76.0 |
| 29 | Monoclinic | NH$_4$VO$_3$ | Al(NO$_3$)$_3$ | 72.7 | 81.2 | 11.7 | 574.0 | 76.0 |
| 30 | Monoclinic | NH$_4$VO$_3$ | Al(OH)$_3$ | 72.6 | 80.9 | 11.1 | 574.0 | 77.0 |
| 31 | Monoclinic | NH$_4$VO$_3$ | Al$_2$O$_3$ | 73.3 | 81.6 | 11.5 | 574.0 | 76.0 |
| 32 | Hexagonal | NH$_4$VO$_3$ | Al$_2$(SO$_4$)$_4$ | 73.5 | 82.9 | 10.6 | 574.0 | 78.0 |
| 33 | Hexagonal | V$_2$O$_5$ | Al$_2$(SO$_4$)$_3$ | 74.0 | 83.1 | 11.7 | 574.0 | 77.0 |
| 34 | Hexagonal | V$_2$O$_4$ | Al$_2$(SO$_4$)$_3$ | 73.4 | 82.8 | 10.7 | 574.0 | 78.0 |

EXAMPLES 35-36

As starting substances were used:
in Example 35:
20 g of BiPO$_4$ identical with that of Example 1;

| | Example 35 % by wt. | Example 36 % by wt. |
|---|---|---|
| Bi$_2$O$_3$ | 60.46 | 57.68 |
| Al$_2$O$_3$ | 12.67 | 11.30 |
| V$_2$O$_5$ | 8.44 | 13.44 |

-continued

| Example 35<br>% by wt. | Example 36<br>% by wt. |
|---|---|
| $P_2O_5$ : 18.41 | $P_2O_5$ : 17.58 |

The colorimetric characteristics of the two pigments are reported in Table VII in which they are compared with those of two commercial chrome titanates having a practically equal $\lambda_D$.

TABLE VII

| Product Examined | $R_V$ | $R_A$ | $R_B$ | $\lambda_D$ | Color Saturation % |
|---|---|---|---|---|---|
| Product of Example 35 | 42.6 | 58.7 | 7.2 | 582.3 | 79.0 |
| Chromium titanate type 1 | 36.6 | 49.7 | 6.4 | 582.5 | 76.0 |
| Product of Example 36 | 49.7 | 65.4 | 7.3 | 580.5 | 81.0 |
| Chromium titanate type 2 | 47.6 | 60.5 | 12.7 | 580.6 | 64.3 |

The products according to this invention, in comparison with the chromium titanates, showed a greater color saturation, a higher reflectance on red and a greater colorimetric purity as can be seen by a visual comparison between the pigment coatings on films.

EXAMPLES 37-46

Following the procedures used in Examples 35 and 36, there were varied the quantities of V and Al with respect to the $BiPO_4$, the molar ratio $Al_2O_3/V_2O_5$ and the calcining temperature.

The operating procedures and the optical characteristics of the yellow and orange-yellow pigments obtained are recorded in Table VIII.

TABLE VIII

| Example No. | V% by weight with respect to starting $BiPO_4$ | Al% by weight with respect to starting $BiPO_4$ | Molar Ratio $Al_2O_3/V_2O_5$ | Temperature °C. | $R_V$ | $R_A$ | $R_B$ | $\lambda_D$ | Color Saturation in % |
|---|---|---|---|---|---|---|---|---|---|
| 37 | 3 | 6.36 | 4.0 | 1000 | 49.4 | 62.7 | 12.5 | 580.3 | 65.8 |
| 38 | 3 | 7.95 | 5.0 | 1000 | 47.6 | 62.8 | 9.2 | 581.4 | 74.0 |
| 39 | 6 | 6.36 | 2.0 | 1000 | 63.7 | 75.4 | 12.2 | 576.7 | 72.5 |
| 40 | 6 | 7.95 | 2.5 | 1000 | 35.7 | 51.4 | 5.5 | 584.7 | 79.2 |
| 41 | 6 | 8.50 | 2.7 | 1100 | 33.6 | 48.8 | 5.4 | 586.0 | 73.2 |
| 42 | 8 | 8.50 | 2.0 | 1000 | 41.8 | 58.6 | 6.3 | 583.5 | 79.5 |
| 43 | 10 | 7.95 | 1.5 | 920 | 56.2 | 70.8 | 7.8 | 578.8 | 80.0 |
| 44 | 10 | 7.95 | 1.5 | 1000 | 54.3 | 69.8 | 7.5 | 579.7 | 80.3 |
| 45 | 12 | 7.63 | 1.2 | 1000 | 65.5 | 77.8 | 8.3 | 576.3 | 81.0 |
| 46 | 12 | 8.50 | 1.35 | 1000 | 51.4 | 65.2 | 6.8 | 579.1 | 80.8 | and 5.59, while their molar ratio $Al_2O/V_2O_5$ is different for the greenish-yellow pigments and for the yellow and orange-yellow pigments, and varies with the molar ratio $Bi_2O_3/V_2O_5$ according to the following scheme:

| Molar ratio $Bi_2O_3/V_2O_5$ | Molar ratio $Al_2O_3/V_2O_5$ of the greenish-yellow products | Molar ratio $Al_2O_3/V_2O_5$ of the yellow and orange-yellow products |
|---|---|---|
| 5.59 | 1–3.1 | >3.1–5.35 |
| 4.19 | 1–2.4 | >2.4–4.0 |
| 3.35 | 1–2.1 | >2.1–3.2 |
| 2.79 | 1–1.8 | >1.8–2.7 |
| 2.39 | 1–1.6 | >1.6–2.3 |
| 2.09 | 1–1.5 | >1.5–2.0 |
| 1.86 | 1–1.4 | >1.4–1.8 |
| 1.67 | 1–1.3 | >1.3–1.6 |
| 1.52 | 1–1.2 | >1.2–1.45 |
| 1.39 | 1–1.18 | >1.18–1.35 |

2. Pigments according to claim 1, characterized in that the molar ratio $Bi_2O_3/V_2O_5$ is comprised between 1.39 and 2.79.

3. Process for preparing the greenish-yellow, yellow, or orange-yellow pigments of claim 1, which process comprises mixing $BiPO_4$ with $Al_2O_3$ and $V_2O_5$, or with compounds of aluminum and vanadium capable of generating $Al_2O_3$ and $V_2O_5$ during calcination, to obtain a mixture having the molar ratios between $Bi_2O_3$, $V_2O_5$, $Al_2O_3$ and $P_2O_5$ defined in claim 1, and calcining the mixture in the presence of air, the calcining being at a temperature between 700° and 1100° C. to obtain a greenish-yellow pigment with a molar ratio $Bi_2O_3/V_2O_5$ of 1.67 or higher; between 880° and 1100° C. to obtain a greenish-yellow pigment with a molar ratio $Bi_2O_3/V_2O_5$ lower than 1.67; and between 900° and 1100° C. to obtain a yellow or orange-yellow pigment.

What we claim is:

1. Greenish-yellow, yellow and orange-yellow pigments with a dominant wave length comprised between 573 and 586 m$\mu$, said pigments being characterized in that they consist essentially of bismuth vanadate of monoclinic structure, bismuth phosphate of monoclinic structure and aluminum phosphate of orthorhombic structure and, in the case of yellow and orange-yellow pigments, also of a compound based on $Bi_2O_3$ and $V_2O_5$, the X-rays diffractogram of which shows the following peaks:
1.87, 1.88, 2.41, 2.77, 2.80, 3.11, 3.82 and 7.6 Å; said pigments being further characterized in that they have a molar ratio $Bi_2O_3/P_2O_5$ equal to 1 and a $Bi_2O_3/V_2O_5$ molar ratio comprised between 1.39

4. The process of claim 3, in which the calcined mixture is cooled and wet-ground.

5. The process of claim 3, in which the mixture is calcined at a temperature between 880° and 1000° C. to obtain a greenish-yellow pigment having a molar ratio $Bi_2O_3/V_2O_5$ of 1.67 or higher.

6. The process of claim 3, in which the mixture is calcined at a temperature between 900° and 1000° C. to obtain a greenish-yellow pigment having a molar ratio $Bi_2O_3/V_2O_5$ lower than 1.67.

7. The process of claim 3, in which the mixture is calcined at a temperature between 900° and 1000° C. to obtain a yellow or orange-yellow pigment.

* * * * *

UNITED STATES PATENT AND TRADEMARK OFFICE
CERTIFICATE OF CORRECTION

PATENT NO. : 4,230,500

DATED : October 28, 1980

INVENTOR(S) : Luigi Balducci et al.

It is certified that error appears in the above—identified patent and that said Letters Patent is hereby corrected as shown below:

Col. 1 - line 36 - "On" should read - - - One - - -;

Col. 2 - lines 54/55 - "$Bi_2O_3/-$ $V_2O_5$" should read - - - $Bi_2O_3/V_2O_5$ - - -;

Col. 4 - line 17 - "$Bi_2O_3/V_2O_5$" should read - - - $\dfrac{Bi_2O_3}{V_2O_5}$ - - -;

Col. 7 - line 29 - "Puverisette" should read - - - Pulverisette - - -;

Col. 7 - lines 53/54 - " ) " after the word "alkydic" should follow the word - - - oil - - -;

Col. 8 - line 22 - " ($\mu D$ )" should read - - - $\lambda D$ - - -;

UNITED STATES PATENT AND TRADEMARK OFFICE
CERTIFICATE OF CORRECTION

PATENT NO. : 4,230,500           Page 2 of 2
DATED : October 28, 1980
INVENTOR(S) : Luigi BALDUCCI et al It is certified that error appears in the above—identified patent and that said Letters Patent is hereby corrected as shown below:

Col. 9 - line 40
Examples 28 - 34     -     "were" should read - - - was - - -;

Col. 9 - Table VI
Ex. 28 under
Vanadium Compound     -     "$NH_{VO3}$" should read - - - $NH_4VO_3$ - - ;

Col. 12 - line 1     -     "$Al_2O/V_2O_5$" should read

- - - $Al_2O_3/V_2O_5$ - - -.

Signed and Sealed this

Tenth Day of March 1981

[SEAL]

*Attest:*

RENE D. TEGTMEYER

*Attesting Officer*      *Acting Commissioner of Patents and Trademarks*